United States Patent [19]

Sorenson et al.

[11] 4,331,205
[45] May 25, 1982

[54] DEPTH CONTROL WHEEL FOR SEED PLANTER

[75] Inventors: Robert S. Sorenson, Hansha; James B. Sorenson, Madelia, both of Minn.

[73] Assignee: Brown County Manufacturing, Inc., New Ulm, Minn.

[21] Appl. No.: 218,266

[22] Filed: Dec. 19, 1980

[51] Int. Cl.³ .............................................. A01C 5/06
[52] U.S. Cl. ................... 172/538; 172/672; 172/415; 111/85; 111/88
[58] Field of Search .............. 172/536, 415, 421, 672, 172/574, 578; 111/85, 88

[56] References Cited

U.S. PATENT DOCUMENTS

| | | | |
|---|---|---|---|
| 2,332,012 | 10/1943 | Rasmussen | 172/536 |
| 2,577,775 | 12/1951 | Lemmon | 111/85 |
| 2,685,243 | 8/1954 | Cole | 172/536 X |
| 3,499,495 | 3/1970 | Pust | 111/88 |
| 3,568,613 | 3/1971 | Lange | 172/672 |
| 4,009,668 | 3/1977 | Brass | 111/88 |
| 4,207,823 | 6/1980 | Steilen | 111/85 |
| 4,275,671 | 6/1981 | Baker | 111/85 |

FOREIGN PATENT DOCUMENTS 2415420 8/1979 France ..................... 111/88

Primary Examiner—Richard J. Johnson
Attorney, Agent, or Firm—Merchant, Gould, Smith, Edell, Welter & Schmidt

[57] ABSTRACT

An attachment (10) for use with an agricultural seeder implement is disclosed. The attachment (10) includes a pair of depth gauge wheels (28) which are aligned with respect to the direction of the intended movement (38) of the implement. The wheels (28) are generally parallel to a pair of furrow disks (12) which are aligned and have forward edges (32) thereof converging. The wheels (28) are disposed for horizontal movement forwardly and rearwardly with respect to the disks (12) in order to afford adjustment of lateral spacing (60, 62) between the disks (12) and wheels (28).

5 Claims, 5 Drawing Figures

DEPTH CONTROL WHEEL FOR SEED PLANTER

TECHNICAL FIELD

The invention of the present application refers broadly to the field of agricultural implements. More specifically, however, it relates to depth gauge wheels for use on a seeder implement. A prefered embodiment is directed to a depth gauge wheel attachment which is adjustable horizontally with respect to an element of the implement which prepares the furrow into which seeds are deposited.

BACKGROUND OF THE INVENTION

Numerous types of seeding implements are known in the agricultural implement art. Typically, however, these implements include a furrowing element which rides over the ground to be cultivated so that a portion of the element digs into the ground to create a trench into which seed is to be inserted. Depending upon the type of seed, the conditions of the earth, and other factors, the desired depth of the trench will vary. In order to provide a structure wherein the portion of the furrowing element which actually digs into the earth is limited, depth gauge wheels can be mounted to the implement alongside the furrowing element, and, in some structures, on either side of the element. The wheels have a circumferential surface which is wide enough so that the wheels will not sink into the ground which is being worked. The wheels can be selectively positioned at different heights with respect to the furrowing element so that the amount of the element which extends below the wheels can be varied.

One prior art structure of this nature is disclosed in U.S. Pat. No. 2,685,243, issued to C. C. Cole on Feb. 15, 1950. The structure of this patent reference includes a yoke having a pair of diverging forks. A depth gauge wheel is attached at the end of each of these forks. An arm common to both of the diverging forks is mounted to the implement frame or an appendage thereto. The yoke is mounted for pivoting about a point on this common arm. The height of the gauge wheels can, thereby, be varied with respect to the furrow element by loosening the bolt securing the common arm at the pivot point and allowing the yoke to be rotated. The yoke can, thereafter, be re-secured in another position by tightening the bolt.

The Cole patent is also illustrative of a seeder implement utilizing a pair of furrow disks comprising the furrow element. The disks angle inwardly toward the front of the furrow element so that, at front edges thereof, the disks approach one another. The depth gauge wheels straddle the disk arrangement so that each panel is positioned closely proximate the immediately adjacent disk.

With a structure such as that described, seeds can be deposited in a trench formed between the two disks. The depth gauge wheels function in the same manner as when there is a unitary furrow element.

Structures such as those illustrated by the Cole patent function effectively under only a limited number of specified soil conditions. Regardless of the height at which the depth gauge wheels are positioned with respect to the furrow disks, the spacing of the wheels from the disks remains relatively constant. It may well be that the structure illustrated in the Cole patent would function well in soil which is moist and pasty. Since the wheels are positioned closely adjacent the disks, the wheels will have the effect of scraping from the disks soil which becomes encrusted thereon.

Under different soil conditions, however, a different spacing between the wheels and disks may be more desirable. Under drier soil conditions, for example, it may be more desirable to have a greater lateral spacing of the components. With a greater spacing, interference of the operation of the disks may be prevented by precluding clogging which might occur as a result of the wedging of dry soil clods between the wheels and disks.

It is these deficiencies in the prior art to which the invention of the present application is directed. A structure manufactured in accordance with this application affords the user of the seeder implement flexibility in configuring the disk/wheel arrangement as a function of soil conditions.

SUMMARY OF THE INVENTION

The present invention is a depth control wheel attachment to be used with a seeder implement. The attachment is for use with a seeder implement which can utilize a furrow element comprising a pair of disks which have forward edges converging to form an angle between the two disks. It includes a pair of wheels substantially alligned with respect to the direction of intended movement of the implement. That is, the wheels are positioned at substantially the same fore-and-aft position. Forward edges of the wheels also converge to form an angle therebetween, which angle approximates the angle formed between the disks. Means are provided for mounting the wheels as part of the attachment so that they straddle the disks. They are disposed for movement forwardly and rearwardly with respect to the disks. This forwardly and rearwardly movement can be accomplished independently of vertical movement of the wheels.

In a preferred embodiment, the wheels can be suspended by a pair of struts extending from a saddle or carrying element. The saddle can be mounted on a generally horizontal frame member for sliding movement in a fore-and-aft direction, that is, in a direction of intended movement of the implement and its reciprocal. As the wheel assembly is thus moved, the lateral spacing between the disks and their immediately adjacent depth gauge wheels is varied. As the wheel assembly is slid forwardly the lateral spacing increases; as the wheel assembly is moved rearwardly, the spacing is decreased.

The invention can further include means for adjusting the height of one of the depth gauge wheels independently of the other. This can be accomplished by providing a saddle which includes a pair of formed extrusions, each extrusion defining a generally vertically extending channel or passage. An end of each strut remote from the end to which a wheel is attached can be passed generally vertically through this passage. A plurality of linearly aligned apertures can be formed in either a wall forming the passage, the strut itself, or both. These apertures can be positioned so that, as the strut is moved along the passage, various of the apertures register with one another. The strut can, thereby, be locked in a desired height relationship to its immediately adjacent furrow disk by inserting a pin through two registering apertures.

The invention of this application is thus an attachment for use with an agricultural seeder implement, which attachment solves various of the problems known in the prior art. The specific advantages of the

DETAILED DESCRIPTION

Figure 1:
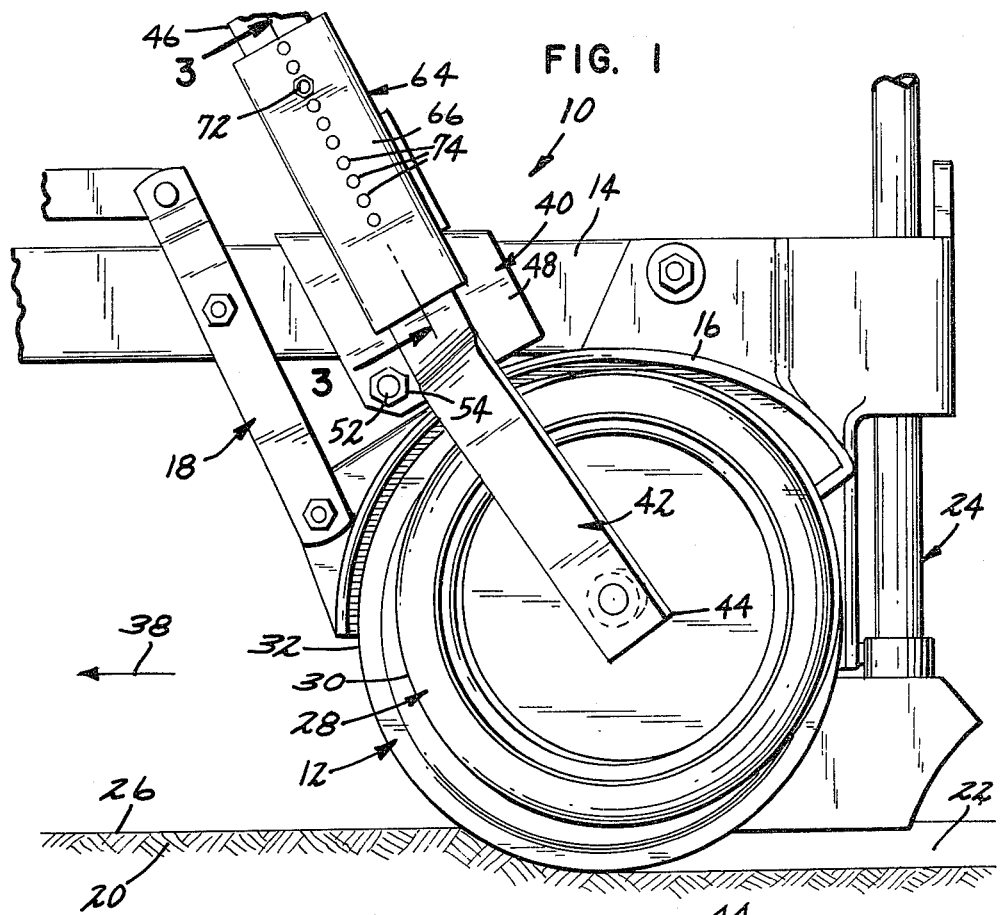
FIG. 1 is a side elevational view of an attachment in accordance with the present application.
Figure 2:
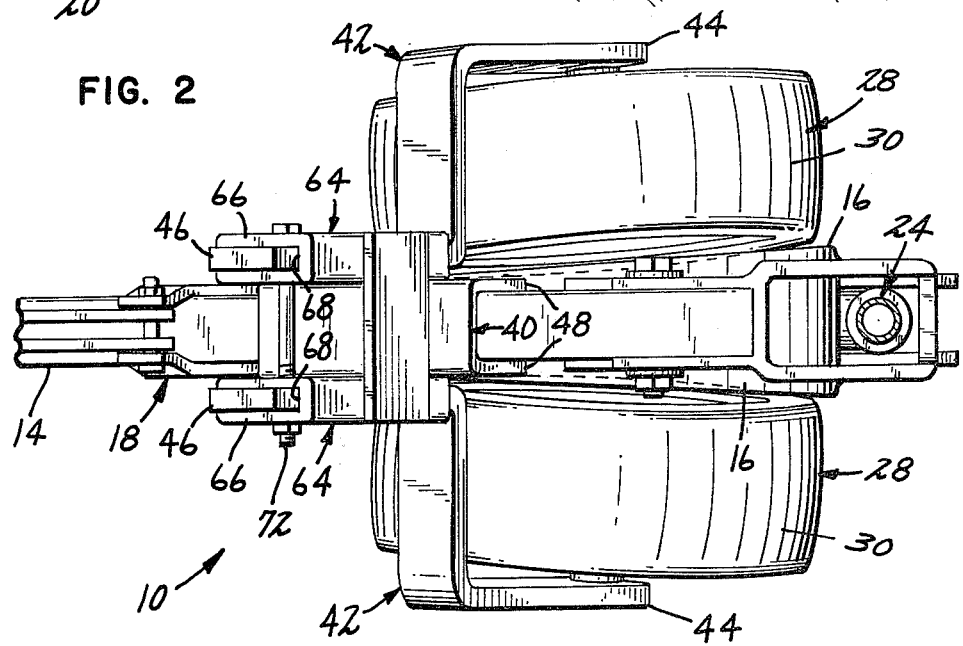
FIG. 2 is a top plan view of the attachment illustrated in FIG. 1.
Figure 3:
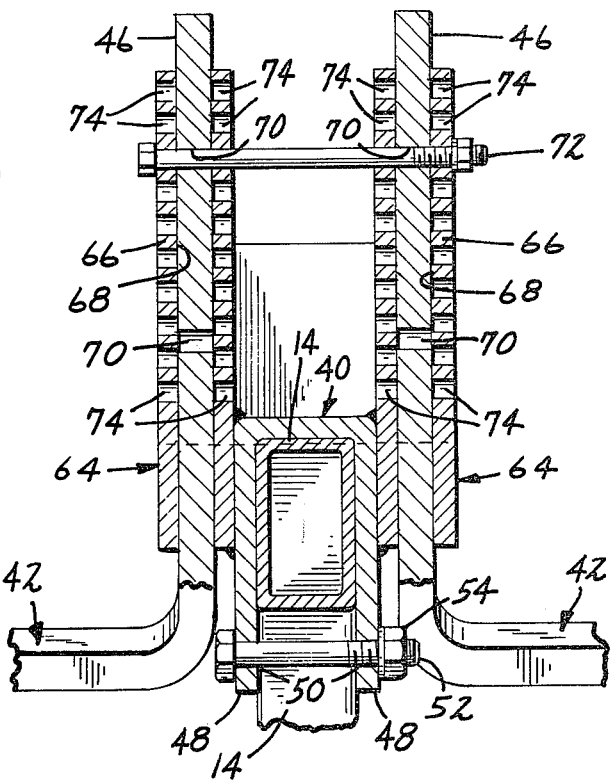
FIG. 3 is an enlarged view taken along the line 3—3 of FIG. 1.
Figure 4:
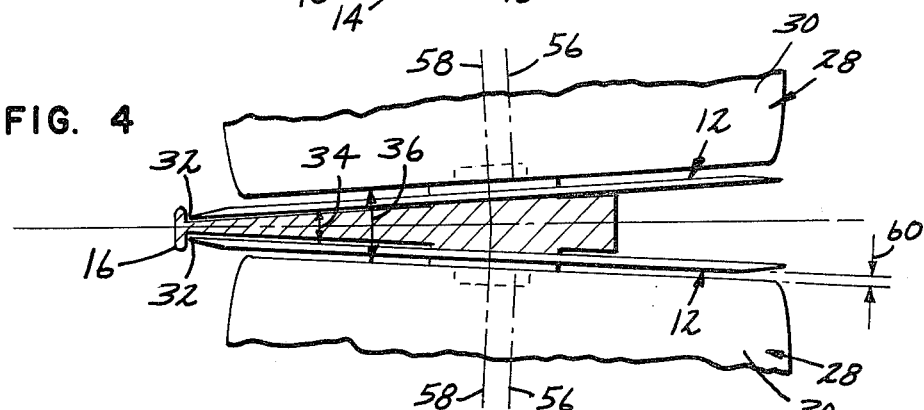
FIG. 4 is a first positional view showing the furrow disks and depth gauge wheels with a small lateral spacing.
Figure 5:
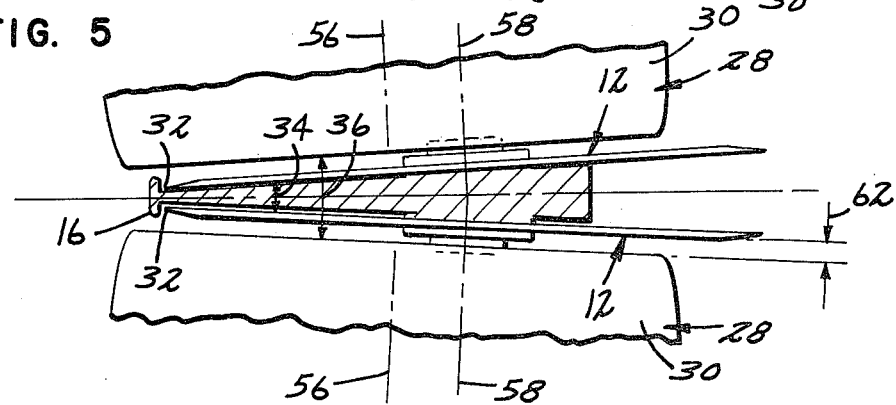
FIG. 5 is a second positional view showing the furrow disks and depth gauge wheels having a greater lateral spacing.

Refering now to the drawings wherein like reference numerals denote like elements throughout the several views, FIGS. 1 and 2 illustrate a depth gauge attachment 10 in accordance with present invention. The attachment 10 is illustrated as it can be mounted to an agricultural seeder implement with which it is used. It will be understood that many types of seeder implements are currently known in the art. Typically, however, such implements include a furrowing element which is substantially aligned along the direction of intended movement of the implement. Although the figures illustrate a furrowing element which includes two forwardly converging furrow disks 12 (as best seen in FIGS. 4 and 5), single disk seed drills are commercially available, and the attachment which comprises the present invention can be used equally as well with single disk drills.

FIG. 1 shows one of the disks 12 as suspended from a frame member 14. The suspension is accomplished by bolting a fender 16, to which the disk 12 is mounted, to the frame member 14. Structural integrity and rigidity of positioning can be increased by providing additional means 18 supporting the fender 16.

In operation of the implement, the disks 12 burrow into the soil 20 which is being tilled to form a trench 22 in which seed to be planted is deposited. Seed depositing means generally indicated by the reference numeral 24 are provided to dispense seed.

The structure heretofore discussed is not new in the art and does not, by itself, comprise the invention. It has been discussed in broad terms to establish the environment in which an attachment 10 in accordance with the invention operates.

Various types of structures are known in the art to control the depth of the trench 22 which is formed by the furrowing element. One typical structure includes a depth gauge wheel arrangement. The wheels have circumferential surfaces 30 which are wide enough to preclude burrowing of the wheels 28 below the surface 26 of the ground 20. By varying the height at which the wheels 28 are disposed with respect to the disks 12, the depth of the trench 22 formed by the disks 12 can be controlled. An attachment 10 in accordance with the present invention is a structure of this nature.

When dual furrow disks 12 are used, they typically have forward edges 32 which converge so as to form an angle 34 between the disks 12. The present depth gauge wheel attachment includes a pair of wheels 28 as typically used on present machines, but which wheels 28 also converge forwardly to form an angle 36 having an arcuate measure substantially the same as the angle 34 between the disks 12. The wheels 28, as are the disks 12, are aligned along the direction of intended movement, represented by arrow 38, of the implement and, consequently, are aligned with respect to the frame member 14. That is, the wheels 28, if disposed parallelly, would be substantially coaxial.

The invention further includes structure for mounting the wheels 28 as part of the attachment 10 with the wheels 28 straddling the furrowed disks 12. The wheels 28 are mounted so that they can be moved, as an assembly, forwardly and rearwardly relative to the disks 12. The structure for accomplishing this allows this movement independent of any vertical upward and downward movement of the wheels 28. Since the wheels 28 are, of course, adjustable upwardly and downwardly to vary the depth of the trench 22 which the disks 12 create, different structures are utilized to accomplish these two different directions of movement.

In accordance with one embodiment of the invention, the attachment 10 can include a saddle 40 which is seated on the frame member 14. The saddle 40 serves as a carrying member by which the wheels 28 are suspended. A pair of struts 42 can be utilized to connect the wheels 28 to the saddle 40. A wheel 28 is rotatabily mounted at the strut's first end 44, or lower end as viewed in FIG. 1, and the second end 46, or upper end, is attached at the saddle 40.

The saddle 40 is disposed for forward and rearward movement along the frame member 14. In order to maintain the saddle 40 in a fixed position along the frame member 14, the saddle 40 can be provided with a pair of appendages 48, one extending downwardly on either side of the member 14. These appendages 48 can have registered apertures 50 formed therein, through which apertures 50 a bolt 52 can be inserted and locked thereto by a nut 54. As the nut 54 is tightened onto the bolt 52, the appendages 48 will be urged toward one another and tightened onto the frame member 14 to secure the saddle 40 thereto at a particular desired location.

FIG. 4 shows the depth gauge wheels 28 with the axis 56 of each disposed somewhat rearwardly of the axis 58 of a corresponding furrow disk 12 immediately adjacent each wheel 28. Because of the similar angle 34, 36 between the wheels 28 and between the disks 12, with the wheels 28 in this rearward position the lateral spacing 60 between each wheel 28 and its corresponding disk 12 will be somewhat small. When the wheels 28 are moved forwardly to a position such as that illustrated in FIG. 5 wherein the axes 56 of the wheels 28 are disposed forwardly of the axes 58 of the corresponding disks 12, the lateral spacing 62 between a wheel 28 and its corresponding disk 12 will increase. As can be seen, the lateral spacing can, thus, be adjusted without being required to vary the height at which the wheels 28 are disposed.

The invention also includes novel means for adjusting the height of the wheels 28 with respect to the furrow disks 12. The structure for accomplishing this allows one wheel 28 to be adjusted vertically independently of the other.

The saddle 40, or member by which the struts 42 are carried, can have a pair of extrusions 64 formed therein. Each extrusion 64 can have a wall 66 defining a generally vertically extending channel or passage 68. The second end 46 of one strut 42 can be slidable disposed within a channel 68 so that the wall 66 encircles the second end 46 of the strut 42.

Height adjustment can be effectuated by sliding the strut 42 through the passage 68 and locking it at one of a plurality of selectable stations disposed along the second end 46 of the strut 42. This locking can be accomplished in one of a number of ways. A plurality of apertures 70 can be formed in the second end 46 of the strut 42 with a single aperture, registrable consecutively with each of the apertures 70 in the strut 42, formed in the wall 44 defining the passage 68. A pin 72 can be inserted through the aperture in the wall 66 and one of the apertures 70 in the strut 42 to position the strut 42 in a desired location so that the wheel 28 suspended therefrom is disposed in an appropriate location with respect to its corresponding disk 12.

Alternatively, the plurality of apertures 74 can be formed in the wall 66 defining the passage 68 with a single aperture formed in the strut 42. The strut 42 can, again, be positioned vertically in a manner as previously described. Desired positioning of the strut 42 so that the wheel 28 is located at the proper height with respect to the disk 12 can be facilitated by providing a plurality of apertures 70, 74 in both the strut 42 and the wall 66 defining the passage 68. Once the wheel 28 is positioned in the desired relative location, any one of the apertures 74 in the wall 66 will be nearly in registration with an aperture 70 in the strut 42.

The saddle 40 can be manufactured of a material such that corrosion due to ionization as a result of engagement between metal components susceptible to such effects is inhibited. It has been found that, by manufacturing the saddle 40 so that the extrusions 64 are formed from aluminum, the desired effects will be achieved without sacrificing strength of the various component parts.

Numerous characteristics and advantages of the invention have been set forth in the foregoing description. It will be understood, of course, that this disclosure is, in many respects, only illustrative. Changes may be made in details, particularly in matters of shape, size, and arrangement of parts without exceeding the scope of the invention. The scope is defined by the language in which the appended claims are expressed.

What is claimed is:

1. An attachment for use with an agricultural seeder implement having a pair of furrow disks substantially aligned with respect to a direction of intended movement of the implement and having forward edges converging to form an angle between the disks, said attachment comprising:
    (a) a pair of wheels substantially aligned with respect to the direction of intended movement of the implement and having forward edges converging to form an angle having an arcuate measure similar to the angle between the disks, each of said wheels having an inner face opposite one of the disks and an outer face directed outwardly;
    (d) means for mounting said wheels as part of said attachment with said wheels straddling the disks, and for movement, independent of upward and downward movement, forwardly and rearwardly relative to the disks;
    (c) a pair of struts, each having a first wheel attachment end by which one of said wheels is supported and a second opposite end, said struts straddling said pair of wheels with each passing adjacent said outer face of said wheel supported thereby;
    (d) a carrying member having a pair of formed extrusions, each defining a generally vertically extending channel, through which channel one of said second ends of said struts slideably moves; and
    (e) means for locking each of said second ends of said struts against movement within said respective channel with one of a number of selectable stations along said second end disposed within said channel.

2. An attachment in accordance with claim 1 wherein said extrusions are formed from aluminum.

3. A depth gauge attachment for use with a seeder having an elongated frame member extending longitudinally in a direction of intended movement of the seeder and a pair of furrow disks fixed with respect to, and extending below, the frame member, the disks being substantially longitudinally aligned with respect to the frame member and having forward edges converging to form an angle therebetween, comprising:
    (a) a pair of depth gauge wheels substantially longitudinally aligned with respect to the frame member and having forward edges converging to form an angle therebetween, said angle having an arcuate measure similar to the angle formed between the furrow disks, said wheels having outwardly directed faces;
    (b) a pair of struts, each having a first wheel attachment end by which one of said wheels is supported and a second opposite end, said struts straddling said pair of wheels with each passing adjacent said outer surface of said wheel supported thereby;
    (c) a carrying member having a pair of formed extrusions, each defining a generally vertically extending channel, through which channel one of said second ends of said struts slideably moves;
    (d) means for locking each of said second ends of said struts against movement within said respective channel with one of a number of selectable stations along said second end disposed within said channel; and
    (e) means for mounting said wheels to the frame member with the furrow disks disposed intermediate said wheels, and for movement, independent of vertical movement, forwardly and rearwardly along the frame member;
    (f) whereby lateral spacing between a furrow disk and the depth gauge wheel generally parallel thereto increases as said wheels are moved forwardly along the frame member and decreases as said wheels are moved rearwardly along the frame member.

4. An attachment in accordance with claim 3 wherein said carrying member comprises a saddle mounted on said frame member for horizontal sliding therealong, and wherein said means for mounting said wheels to said frame member comprises said carrying member, said struts, and said means for locking each of said second ends of said struts against movement within said respective channel.

5. An attachment in accordance with claim 4 further comprising means for selectively maintaining said saddle at defined positions along said frame member.

* * * * *

UNITED STATES PATENT AND TRADEMARK OFFICE
CERTIFICATE OF CORRECTION

PATENT NO. : 4,331,205
DATED : May 25, 1982
INVENTOR(S) : Robert S. Sorenson and James B. Sorenson It is certified that error appears in the above-identified patent and that said Letters Patent are hereby corrected as shown below:

Column 1, line 54, for "panel" read "wheel".

Column 3, line 23, for "with" read "with the".

Column 4, line 26, for "rotatabily" read "rotatably".

Column 4, line 68, for "slidable" read "slideable".

Column 5, line 59, for "(d)" read "(b)".

Signed and Sealed this

Twenty-first Day of September 1982

[SEAL]

Attest:

GERALD J. MOSSINGHOFF

Attesting Officer

Commissioner of Patents and Trademarks